United States Patent Office 3,505,315
Patented Apr. 7, 1970

3,505,315
5,7-DIHYDRO-6-OXO-6H-INDAZOLO[2,3-D][1,4]
BENZODIAZEPINES-12-SULFONAMIDES
Stanley C. Bell, Narberth, Pa., assignor to American
Home Products Corporation, New York, N.Y., a corporation of Delaware
No Drawing. Continuation-in-part of application Ser. No.
614,819, Feb. 9, 1967. This application Apr. 12, 1968,
Ser. No. 721,097
Int. Cl. C07d 53/06
U.S. Cl. 260—239.3                    11 Claims

ABSTRACT OF THE DISCLOSURE

This invention is concerned with 5,7-dihydro-6-oxo-6H-indazolo[2,3-d][1,4]benzodiazepine - 12 - sulfonamides which are pharmacologically efficacious as anti-inflammatory agents.

CROSS REFERENCE TO RELATED APPLICATION

This application is a continuation-in-part of application Ser. No. 614,819 filed Feb. 9, 1967 by S. C. Bell and entitled "5,7 - Dihydro - 6 - Oxo-6-Indazolo[2,3-d][1,4] Benzodiazepines-12-Sulfonamides," now abandoned.

This invention relates to new and novel benzodiazepinesulfonamides. In particular, it is concerned with 5,7-dihydro-6-oxo-6H-indazolo[2,3 - d][1,4]benzodiazepine-12-sulfonamides which are therapeutically active.

The new and novel compounds included within the purview of the present invention are illustrated by the following formula:

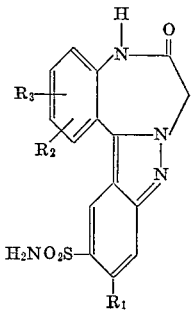

wherein $R_1$, $R_2$ and $R_3$ are hydrogen, halogen, lower alkyl and lower alkoxy. Typical examples thereof are: 2 - chloro-5,7-dihydro-6-oxo-6H-indazolo[2,3-d][1,4]benzodiazepine-12-sulfonamide; 5,7-dihydro-6 - oxo-6H-indazolo[2,3 - d][1,4]benzodiazepine - 12-sulfonamide; 2, 11-dibromo-5,7-dihydro-6 - oxo-6H-indazolo[2,3-d][1,4] benzodiazepine-12-sulfonamide and 5,7-dihydro-3-methyl-6-oxo-6H-indazolo[2,3-d][1,4]benzodiazepine - 12-sulfonamide.

The benzodiazepinesulfonamides of the present invention may be prepared by the process which is hereafter schematically depicted:

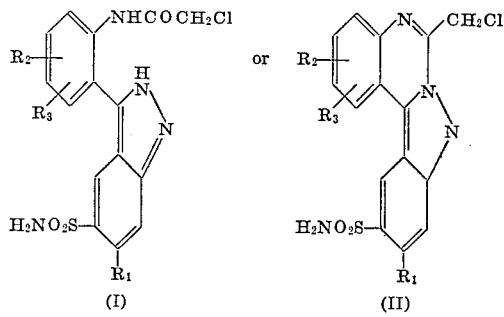

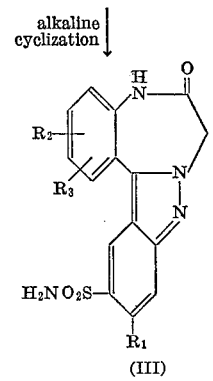

wherein $R_1$, $R_2$ and $R_3$ are defined as above. This reaction is effected by contacting a 3-(2-chloroacetamidophenyl)sulfamoylindazole (I) or a 6-chloromethylindazoloquinazolinesulfonamide (II) with an alkaline cyclizing agent in a reaction-inert solvent. Preferably this reaction is conducted with sodium hydroxide in an ethanol-water mixture.

When the cyclization reaction is complete, the reaction mixture is acidified and the resulting solid is separated by filtration. Thereafter, the resulting 5,7-dihydro-6-oxo-6H-indazolo[2,3-d][1,4]benzodiazepine - 12 - sulfonamide (III) may be recrystallized by conventional procedures from suitable solvents, e.g. dimethylformamide-water mixtures.

By alkaline cyclizing agent as employed above is meant any base. Many such bases will readily suggest themselves to those skilled in the art of chemistry, for example, sodium hydroxide, potassium hydroxide. The term "reaction-inert solvent" is meant to include any liquid which will dissolve the reactants and not interfere with their interaction, e.g. alkanols, alkanol-water mixtures, and glycol ethers, such as 2-methoxyethanol, 2-ethoxyethanol, methoxy and ethoxy propanols, as well as amides such as dimethylforamide. The amount of solvent used is not critical, it being only necessary to use sufficient solvent to provide a reaction medium for the reactants. The acid used to acidify the reaction medium may be any appropriate organic or inorganic acid, for example, acetic, citric, tartaric lactic, hydrochloride, hydrobromic, sulfuric and phosphoric acid.

The two starting compounds which may be employed in the aforesaid process, in particular, the 3-(2-chloroacetamidophenyl)sulfamoylindazoles (I) and the 6-chloromethylindazoloquinazolinesulfonamides (II) are prepared from 3 - (2 - aminophenyl)sulfamoylindazoles which are described in copending U.S. patent application, Ser. No. 610,471, entitled "Indazole-5-sulfonamides," filed on Jan. 20, 1967 by S. C. Bell and C. Gochman. The 3 - (2-chloroacetamidophenyl)sulfamoylindazoles (I) are prepared as described in Examples V and VI, and the 6-chloromethylindazoloquinazolinesulfonamides are prepared by the procedure described in Examples I to IV.

In accord with the present invention, the new 5,7-dihydro-6-oxo-6H-indazolo[2,3 - d][1,4]benzodiazepines-12-sulfonamides herein described have been found to possess interesting pharmaceutical properties which render them useful as synthetic medicinals. More particularly, these compounds, in standard pharmacological tests have exhibited utility as anti-inflammatory agents.

In the pharmacological evaluation of the biological activity of the compounds of this invention the in vivo effects are tested as follows. The following procedure is used to determine activity against influenza virus. The hosts may be any standard experimental animals such as mice, ferrets and rabbits, and the like, but mice are the preferred test subjects, and the test procedures described here are in regard to the use of mice as hosts. For influenza virus infection mice weighing 14 to 15 grams are used.

Influenza A virus is inoculated intra-nasally into mice under light ether anesthesia. The soluble compounds to be tested are dissolved in an isotonic solution while the insoluble compounds to be tested are ground, then suspended in 0.5 percent carboxymethylcellulose or the like.

The test compounds are administered at various dose levels depending upon the activity of the compound, each dose level being orally administered to each of a group of ten mice. Two groups of ten virus-inoculated mice are not treated with the test compound and are used as controls. Treatment is started after infection, and the best dosage schedule used is determined for each compound. The observation period for mice infected wtih influenza virus is 21 days.

One method of evaluation used consists of a post mortem examination of the host lungs to determine the degree of consolidation. The amount of lung consolidation among the treated animals is compared with that of the control animals. The extent of lung consolidation is visually noted and rated by a numerical score. The scores for the treated animals are compared statistically with the scores of the control group. The accepted standard of $P<0.05$ is required for significance.

The compounds of the present invention when tested as above reduce the amount of lung inflammation at a dose of 0.3 milligram per kilogram of the body weight of the host.

When the compounds of this invention are employed as anti-inflammatory agents, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

The following examples are given by way of illustration and are not to be construed as limitations of this invention, variations of which are possible without departing from the scope and spirit thereof.

EXAMPLE I

To a mixture of 2.7 g. of 3-(2-amino-5-chlorophenyl)-5-sulfamoyd-1H-indazole in 60 ml. of acetic acid, there is added 5 ml. of chloroacetyl chloride. The reaction mixture is refluxed for a half hour and on cooling there is collected 2.3 g. of yellow product which is 2-chloro-6-chloromethylindazolo[2,3-c]quinazoline - 11 - sufonamide M.P. >300° C.

Analysis.—Calcd. for $C_{15}H_{10}Cl_2N_4O_2S$ (percent): N, 14.70; Cl, 18.60; S, 8.41. Found (percent): N, 15.08; Cl, 18.70; S, 8.4.

A mixture of the above prepared 2-chloro-6-chloromethylindazolo[2,3-c]quinazoline-11-sulfonamide, ethanol and water is made alkaline with sodium hydroxide and then acidified with acetic acid. The solid is collected and recrystallized from dimethylformamide-water to afford 2-chloro - 5,7-dihydro-6-oxo-6H-indazolo[2,3-d][1,4]benzodiazepine-12-sulfonamide, M.P. >300° C.

Analysis.—Calcd. for $C_{15}H_{11}ClN_4O_3S \cdot H_2O$ (percent): C, 47.31; H, 3.44; N, 14.71; Cl, 9.31. Found (percent): C, 46.77; H, 3.71; N, 14.22; Cl, 9.48.

In a similar manner, 3-(2-aminophenyl)-5-sulfamoyl-1H-indazole is reacted with chloroacetyl chloride to produce 6-chloromethylindazole[2,3-c]quinazoline-11-sulfonamide which is then converted to 5,7-dihydro-6-oxo-6H-indazolo[2,3-d][1,4]benzodiazepine-12-sulfonamide.

EXAMPLE II

To a mixture of 6.0 g. of 3-(2-amino-5-bromophenyl)-6-bromo-5-sulfamoyl-1H-indazole in 150 ml. of acetic acid, there is added 10 ml. of chloroacetyl chloride and the mixture is refluxed for one hour. On cooling the precipitated product is separated by filtraation to afford 2,10-dibromo - 6 - chloromethylindazolo[2,3-c]quinazoline-11-sulfonamide.

The above prepared quinazolinesulfonamide is admixed with water and ethanol, make alkalene with potassium hydroxide and then acidified with acetic acid to yield 2,11-dibromo - 5,7-dihydro - 6-oxo - 6H - indazolo[2,3-d][1,4]benzodiazepine-12-sulfonamide.

EXAMPLE III

Employing the procedure of Examples I and II, to react an appropriate 3-(2-aminophenyl)-5-sulfamoyl-1H-indazole with chloroacetyl chloride the following 6-chloromethylindazoloquinazolinesulfonamides are obtained which are then converted to their corresponding benzodiazepinesulfonamides:

| Quinazolinesulfonamide | Benzodiazepine |
| --- | --- |
| 6-chloromethyl-2-fluoroindazolo[2,3-c]quinazoline-11-sulfonamide. | 2-fluoro-5,7-dihydro-6-oxo-6H-indazolo[2,3-d][1,4]benzodiazepine-12-sulfonamide. |
| 6-chloromethyl-3-ethylindazolo[2,3-c]quinazoline-11-sulfonamide. | 5,7-dihydro-3-ethyl-6-oxo-6H-indazolo[2,3-d][1,4]benzodiazepine-12-sulfonamide. |
| 6-chloromethyl-10-methoxyindazolo[2,3-c]quinazoline-11-sulfonamide. | 5,7-dihydro-11-methoxy-6-oxo-6H-indazolo[2,3-d][1,4]benzodiazepine-12-sulfonamide. |
| 2,3-dichloro-6-chloromethyl-10-methylindazolo[2,3-c]quinazoline-11-sulfonamide. | 2,3-dichloro-5,7-dihydro-11-methyl-6-oxo-6H-indazolo[2,3-d][1,4]benzodiazepine-12-sulfonamide. |
| 2-chloro-6-chloromethyl-3-methylindazolo[2,3-c]quinazoline-11-sulfonamide. | 2-chloro-5,7-dihydro-3-methyl-6-oxo-6H-indazolo[2,3-d][1,4]benzodiazepine-12-sulfonamide. |
| 6-chloromethyl-2,3-dimethylindazolo[2,3-c]quinazoline-11-sulfonamide. | 5,7-dihydro-2,3-dimethyl-6-oxo-6H-indazolo[2,3-d][1,4]benzodiazepine-12-sulfonamide. |

EXAMPLE IV

To a mixture of 3.0 g. of 3-(2-amino-5-tolyl)-5-sulfamoyl-1H-indazole in 60 ml. of acetic acid, there is added 5 ml. of chloroacetyl chloride and the mixture is refluxed for a half hour. Thereafter, the reaction mixture is cooled and the product is separated by filtration to afford 6 - chloromethyl-2-methylindazolo[2,3-c]quinazoline-11-sulfonamide.

The above prepared indazoloquinazoline sulfonamide is then admixed with aqueous ethanol, made alkaline with potassium hydroxide and acidified with acetic acid. The precipitated solid is separated by filtration and recrystallized from a dimethylformamide-water mixture to afford 5,7 - dihydro - 2 - methyl-6-oxo-6H-indazole[2,3-d][1,4]benzodiazepine-12-sulfonamide.

In the same manner, 5,7-dihydro-3-methoxy-6-oxo-6H-indazolo[2,3-d] [1,4]benzodiazepine-12-sulfonamide and 2 - ethoxy - 5, 7-dihydro-6-oxo-6H-indazolo[2,3-d][1,4]benzodiazepine-12-sulfonamide are prepared.

EXAMPLE V

To a solution of 5.0 g. of 3-(2-amino-5-chlorophenyl)-5-sulfamoyl-2H-indazole in 50 ml. of dimethoxyethane there is added 5.0 g. of chloroacetic anhydride and the solution is warmed on the steam bath for five minutes. The reaction solution containing the 3-(2-chloroacetamido-5-chlorophenyl)-5-sulfamoyl-2H-indazole is diluted with water and made alkaline with sodium hydroxide. The reaction mixture is then acidified with acetic acid and the product collected and washed with ethanol. In this manner, there is obtained 4.8 g. of 2-chloro-5,7-dihydro-6-oxo - 6H-indazolo[2,3-d][1,4]benzodiazepine-12-sulfonamide, M.P.>300° C.

Analysis.—Calcd. for $C_{15}H_{11}ClN_4O_3S \cdot H_2O$ (percent): C, 47.31; H, 3.44; N, 14.71; Cl, 9.31. Found (percent): C, 46.77; H, 3.71; N, 14.22; Cl, 9.48.

Similarly, 3 - (2-aminophenyl)-6-chloro-5-sulfamoyl-2H-indazole is reacted with chloroacetic anhydride to afford 3 - (2 - chloroacetamidophenyl)-6-chloro-5-sulfamoyl-2H-indazole which is then reacted with sodium hydroxide to yield 11-chloro-5,7-dihydro-6-oxo-6H-indazolo[2,3-d][1,4]benzodiazepine-12-sulfonamide.

EXAMPLE IV

Repeating the procedure of Example V the following 3 - (2 - chloroacetamidophenyl)sulfamoylindazole intermediates are produced and then cyclized to afford the following 5,7 - dihydro - 6-oxo-6H-indazolo[2,3-d][1,4]benzodiazepine-12-sulfonamide products:

| Intermediates | Products |
| --- | --- |
| 3-(2-chloroacetamidophenyl)-6-methyl-5-sulfamoyl-2H-indazole. | 5,7-dihydro-11-methyl-6-oxo-6H-indazolo[2,3-d][1,4]benzodiazepine-12-sulfonamide. |
| 3-(2-chloroacetamido-4-tolyl)-6-ethoxy-5-sulfamoyl-2H-indazole. | 11-ethoxy-5,7-dihydro-3-methyl-6-oxo-6H-indazolo[2,3-d][1,4]-benzodiazepine-12-sulfonamide. |
| 3-(2-chloroacetamido-4,5-dimethoxyphenyl)-5-sulfamoyl-2H-indazole. | 5,7-dihydro-2,3-dimethoxy-6-oxo-6H-indazolo[2,3-d][1,4]benzodiazepine-12-sulfonamide. |
| 3-(2-chloroacetamidophenyl)-6-fluoro-5-sulfamoyl-2H-indazole. | 11-fluoro-5,7-dihydro-6-oxo-6H-indazolo[2,3-d][1,4]benzodiazepine-12-sulfonamide. |

What is claimed is:

1. A compound selected from the group consisting of those having the formula:

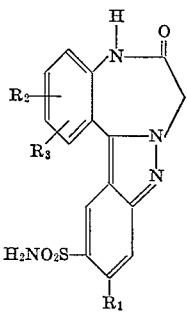

wherein $R_1$, $R_2$ and $R_3$ are selected from the group consisting of hydrogen, halogen, lower alkyl and lower alkoxy.

2. A compound as described in claim 1 which is: 2-chloro - 5,7-dihydro-6-oxo-6H-indazolo[2,3-d][1,4]benzodiazepine-12-sulfonamide.

3. A compound as described in claim 1 which is: 5,7-dihydro - 6-oxo-6H-indazolo[2,3-d][1,4]benzodiazepine-12-sulfonamide.

4. A compound as described in claim 1 which is: 2,11-dibromo - 5,7 - dihydro-6-oxo-6H-indazolo[2,3-d][1,4]benzodiazepine-12-sulfonamide.

5. A compound as described in claim 1 which is: 2-fluoro - 5,7-dihydro - 6-oxo-6H-indazolo[2,3-d][1,4]benzodiazepine-12-sulfonamide.

6. A compound as described in claim 1 which is: 5,7-dihydro - 11 - methoxy-6-oxo-6H-indazolo[2,3-d][1,4]benzodiazepine-12-sulfonamide.

7. A compound as described in claim 1 which is: 2,3-dichloro - 5,7 - dihydro-11-methyl-6-oxo-6H-indazolo[2,3-d][1,4]benzodiazepine-12-sulfonamide.

8. A compound as described in claim 1 which is: 5,7-dihydro - 2,3 - dimethyl - 6 - oxo-6H-indazolo[2,3-d][1,4]benzodiazepine-12-sulfonamide.

9. A compound as described in claim 1 which is: 5,7-dihydro - 2 - methyl-6-oxo-6H-indazolo[2,3-d][1,4]benzodiazepine-12-sulfonamide.

10. A process for the production of a compound having the formula:

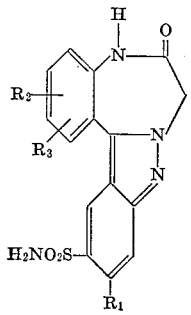

wherein $R_1$, $R_2$ and $R_3$ are selected from the group consisting of hydrogen, halogen, lower alkyl and lower alkoxy which comprises contacting a compound selected from those having the formulae:

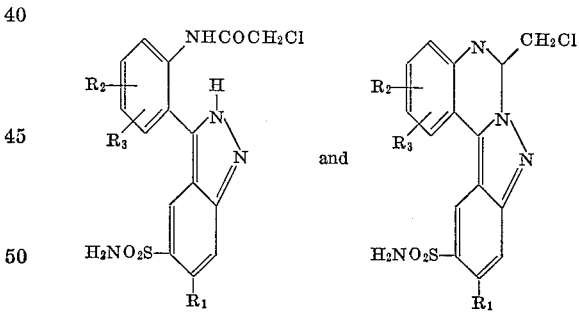

wherein $R_1$, $R_2$ and $R_3$ are defined as above with an alkaline cyclizing agent in a reaction-inert solvent.

11. A process as described in claim 10 wherein the alkaline cyclizing agent is sodium hydroxide.

References Cited

UNITED STATES PATENTS 3,334,090   8/1967   Ott _____ 260—239.3

HENRY R. JILES, Primary Examiner

R. T. BOND, Assistant Examiner

U.S. Cl. X.R.

260—256.5, 309.2; 424—273